2 Sheets--Sheet 1.
G. G. J. MILLAR & E. J. TODD.
Corn-Planters.
No. 152,669. Patented June 30, 1874.
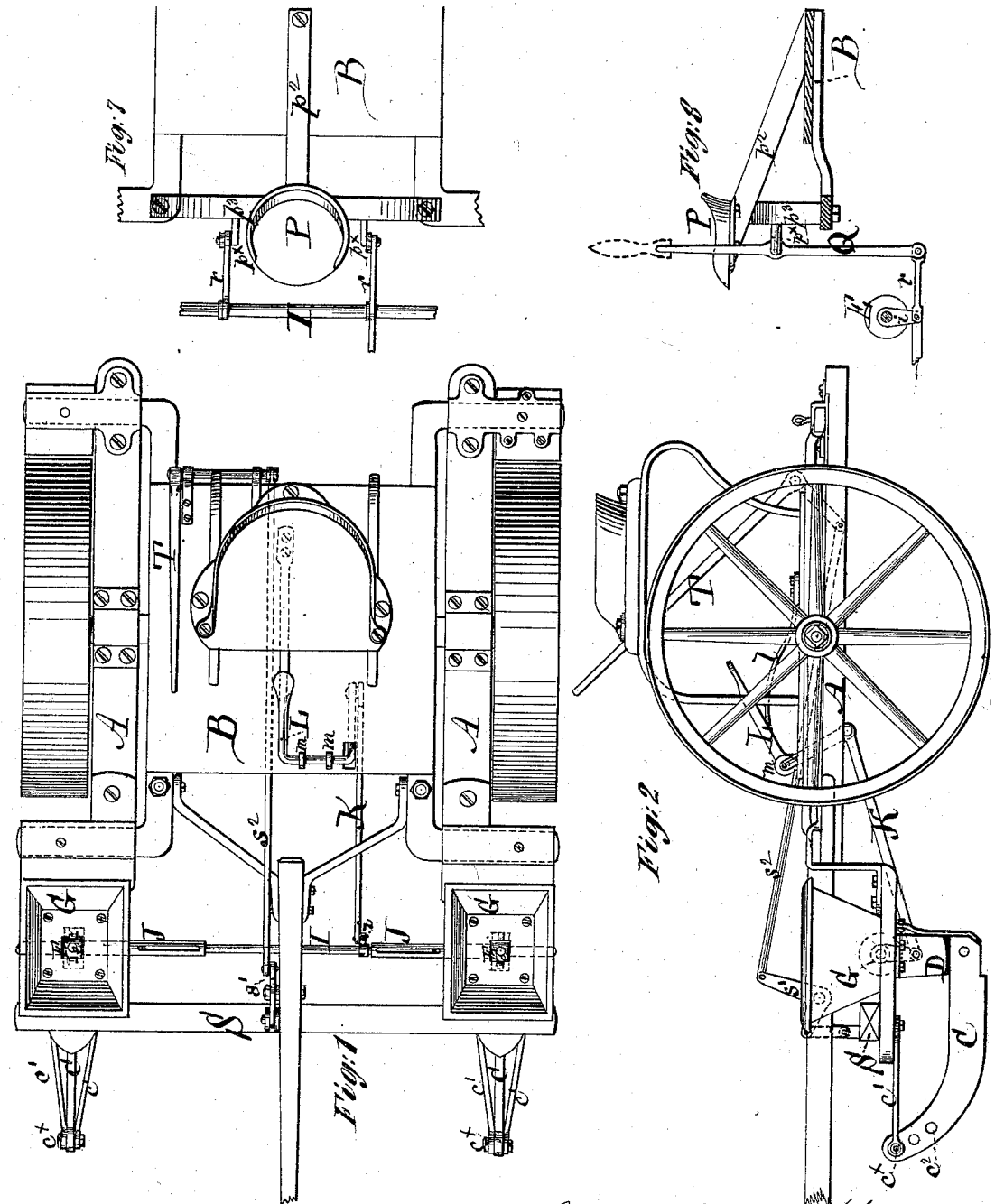

G. G. J. MILLAR & E. J. TODD.
Corn-Planters.
No. 152,669.
2 Sheets--Sheet 2.
Patented June 30, 1874.
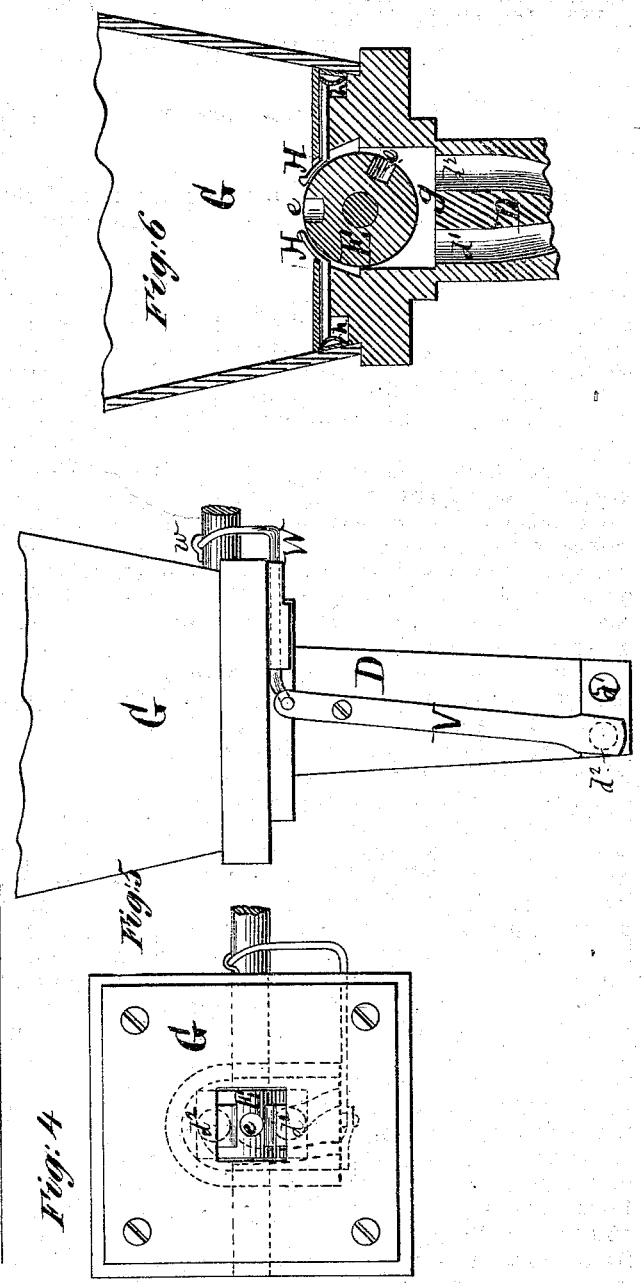
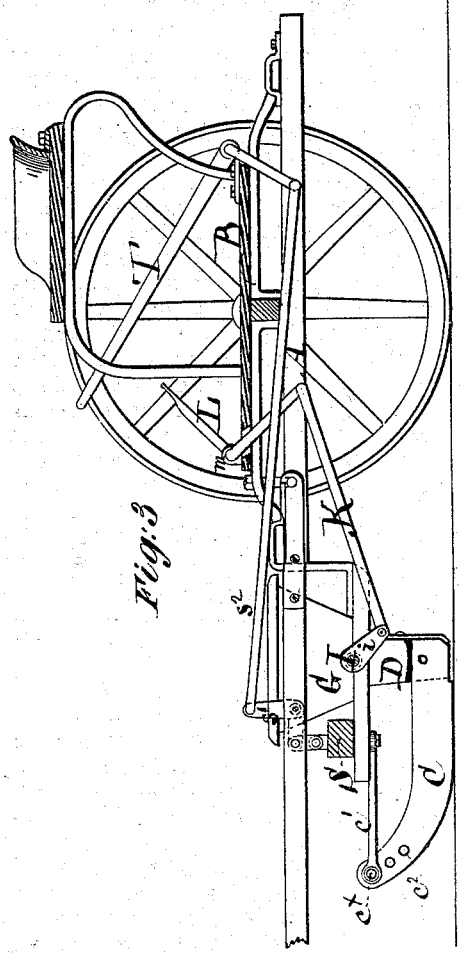

UNITED STATES PATENT OFFICE.

GEORGE G. J. MILLAR AND ELI J. TODD, OF LOCKBOURNE, OHIO; SAID TODD ASSIGNOR TO SAID MILLAR.

IMPROVEMENT IN CORN-PLANTERS.

Specification forming part of Letters Patent No. 152,669, dated June 30, 1874; application filed April 6, 1874.

*To all whom it may concern:*

Be it known that we, GEORGE G. J. MILLAR and ELI J. TODD, both of Lockbourne, in the county of Franklin and State of Ohio, have jointly invented certain Improvements in Corn-Planters, of which the following is a specification:

This invention relates to certain improvements in seed-planters; and consists in the combination, with the bar connecting the furrow-openers, of a series of levers and connecting-rods, constructed and arranged, as hereinafter described, to enable the driver to raise the furrow-openers from contact with the ground when desired.

In the accompanying drawing, Figure 1 is a top view of our improved corn-planter. Fig. 2 is a side view of the same. Fig. 3 is a longitudinal vertical section. Fig. 4 is a top view of the hopper. Fig. 5 is a rear view of the same, together with the dropping-tube. Fig. 6 is a transverse section of the same. Fig. 7 is a top view of the front portion of the platform, showing the application of the curved bar, the seat for the driver, and the levers and connecting-rods for operating the feeding-cylinders by hand. Fig. 8 is a section of the same.

The frame A and platform B are similar in form and construction to the corresponding parts described in my patent aforesaid, with the exceptions hereinafter particularly referred to, the frame being provided with means for increasing or diminishing the width similar to those described in said patent. At the front end of the frame, on each side, is a sled-shaped furrow-opener, C, the rear end of which is pivoted to the upright hollow post D, and the front end is suspended between the outer ends of two bars, $c^1 c^1$, whose inner ends are rigidly attached to the frame under the hopper. Pins or bolts $c^x$ pass through the bars $c^1 c^1$, and through perforations $c^2$ in the front portion of the furrow-opener, by which means it may be adjusted at different angles of inclination, to facilitate its working in soils of different character. When used in ordinary soils it is arranged to run horizontally; but when the soil is obstructed by sod or fibrous rubbish, such as stalks or roots, the furrow-opener is arranged with its front end inclined upward, so as to act as a cutter. The feeding-cylinder E is provided with cups $e$, and is arranged to operate in the bottom of the hopper or seed-box G in a similar manner to that described in my patent aforesaid. On the under side of the bottom of the hopper, over and on each side of the feeding-cylinder, and in line with the plane of oscillation thereof, is a groove or depression, in which is arranged (see Fig. 6) a sliding elastic cut-off, consisting of a plate or bar, H, having its rear end resting against a spring, $h$, and its front end curved to correspond with the periphery of the cylinder E, and then turned up so as to protrude slightly into the hopper. When a grain of corn protrudes above the top of the cup $e$ as the cylinder E is being rotated in either direction, the plate H either lifts it out of the cup, or is itself pressed back against the spring $h$, so as to allow the grain to pass down into the recess $g$ under the cylinder. The outer end of the bar H being rounded off smoothly, the grain is not cut or bruised in its passage to the drill-tube. The feeding-cylinders E have tubes J attached to the inner ends of their shafts, which tubes have longitudinal slots formed in them. A rod, I, has its ends inserted in the tubes J, with pins extending therefrom and engaging with the slots, so as to cause the rod and tubes to rotate together, and also to preserve the connection of the feeding-cylinders when the wheels and drills are adjusted to either a broad or narrow gage. From the under side of the rod I extend two arms, $i$, one of which is connected, by a rod, K, with the short arm of an elbow-lever, L, having its fulcrum on the platform B, and its long arm constituting a treadle, and resting upon a spring, $l$, as shown in Fig. 2. Between its two arms the lever L is bent laterally to form its axis, and it may be secured to the platform by staples or eyebolts $m$.

When the driver or operator occupies the seat N, which is elevated above the platform, he operates the feeding-cylinders by working the treadle-lever L with his foot, so as to impart an oscillating or reciprocating rotary motion to the cylinders through the connecting-rod K, arm $i$, rod I, and tubes J. When the dropping-cylinders are to be operated by hand, the dropper or operator (see Figs. 7 and 8) occupies the seat P, which is attached to a bar, $p^2$, the rear end of which is bolted to the platform B, and the front portion rests upon an arched bar, $p^3$, running transversely of the machine, and having its ends bolted to the front portions of the sides of the frame. From the arched bar $p^3$ extend two arms, $p^\times$, to the ends of which are pivoted hand-levers Q, having their lower ends connected, by rods $r$, with the arms $i$ on the shaft I. One of the rods $r$ extends beyond the point where it is pivoted to the arm $i$ a sufficient distance to prevent the cylinders from being rotated too far in either direction. The levers Q may be provided with a single handle, $q$, which may be changed from one lever to the other, when desired, according to the direction the operator is facing when occupying the seat P. The working of the levers Q by hand operates the feeding-cylinders in the same same manner as the working of the treadle-lever L. The furrow-openers are connected by a bar, S, provided with series of bolt-holes to facilitate the changing of the gage of the machine. About midway of its length the bar is connected, by a rod or chain, with one arm of an elbow-lever, $s^1$, the other end of which is connected, by a rod, $s^2$, with a hand-lever, T. The elbow-lever is pivoted to the tongue of the machine, and the hand-lever is pivoted to the side or rear of the platform. By depressing the hand-lever T the furrow-openers and hoppers may be lifted entirely from contact with the ground. The upright post D is provided with two tubes, $d^1$ $d^2$, for conveying the seed from the hopper to the ground. The tube $d^1$ is situated in the rear portion of the post, and communicates with one of the seed-cups $e$, and its lower end is situated on one side of a vertical central line drawn through the post. The tube $d^2$ has its upper end situated in the front portion of the post, and communicates with the other seed-cup, $e$, and the tube is curved or twisted so as to terminate in the rear portion of the post, beside the termination of the tube $d^1$. On the rear side of the post D a bar or plate, V, is pivoted so as to oscillate in a vertical plane at right angles with the line of travel of the machine. To the upper end of the bar V is pivoted one end of a rod, W, which is bent at a right angle, and has its other end curved or twisted in the form of a screw-thread, and passing through a staple, $y$, on the shaft of the dropping-cylinder. As said shaft is rotated to operate the droppers, the bar V is caused to oscillate and alternately arrest and drop the seed from the tubes $d^1$ $d^2$.

What we claim as new, and desire to secure by Letters Patent, is—

The combination, with the bar S, connecting the furrow-openers, of the elbow-lever $s^1$, connecting-rod $s^2$, and hand-lever T, substantially as and for the purpose shown and described.

GEORGE G. J. MILLAR.
ELI J. TODD.

Witnesses:
C. G. McGUIER,
R. G. McLEAN.